United States Patent [19]

Speer et al.

[11] Patent Number: 5,648,020

[45] Date of Patent: *Jul. 15, 1997

[54] OXYGEN SCAVENGING COMPOSITION FOR LOW TEMPERATURE USE

[75] Inventors: Drew Ve Speer; William Peyton Roberts, both of Colombia, Md.

[73] Assignee: W. R. Grace & Co.-Conn., New York, N.Y.

[*] Notice: The term of this patent shall not extend beyond the expiration date of Pat. No. 5,310,497.

[21] Appl. No.: 569,373

[22] Filed: Dec. 6, 1995

Related U.S. Application Data

[63] Continuation of Ser. No. 196,744, Feb. 15, 1994, abandoned, which is a continuation of Ser. No. 955,546, Oct. 1, 1992, Pat. No. 5,310,497.

[51] Int. Cl.$^6$ .............................. C09K 15/02; C09K 15/04
[52] U.S. Cl. .................... 252/188.28; 252/181.3; 526/90; 526/335; 206/524.2; 502/402; 502/49; 428/411.1
[58] Field of Search ................ 252/188.28, 181.3; 526/90, 335; 206/524.2; 502/402, 49; 428/411.1

[56] References Cited

U.S. PATENT DOCUMENTS

| | | | |
|---|---|---|---|
| 3,935,141 | 1/1976 | Potts et al. | 526/141 |
| 4,908,151 | 3/1990 | Inoue et al. | 252/188.28 |
| 4,983,651 | 1/1991 | Griffin | 524/47 |
| 5,021,515 | 6/1991 | Cochran et al. | 525/371 |
| 5,108,807 | 4/1992 | Tucker | 428/35.2 |
| 5,286,407 | 2/1994 | Inoue et al. | 252/188.28 |
| 5,310,497 | 5/1994 | Ve Speer et al. | 252/188.28 |
| 5,364,555 | 11/1994 | Zenner et al. | 252/188.28 |

FOREIGN PATENT DOCUMENTS

| | | |
|---|---|---|
| 0301719 | 2/1989 | European Pat. Off. . |
| 0335520 | 10/1989 | European Pat. Off. . |
| 0413105 | 2/1991 | European Pat. Off. . |
| 0454437 | 10/1991 | European Pat. Off. . |
| 0507207 | 10/1992 | European Pat. Off. . |
| 0520257 | 12/1992 | European Pat. Off. . |

OTHER PUBLICATIONS

International Search Report–PCT/US 93/09125–19 Nov. 1993.

*Primary Examiner*—Joseph D. Anthony
*Attorney, Agent, or Firm*—Howard J. Troffkin

[57] ABSTRACT

Improved compositions for scavenging oxygen are disclosed. These materials, characterized by low degree crystallinity and a glass transition temperature of lower than −15° C., have high oxygen scavenging rates at low temperatures. The composition comprises an ethylenically unsaturated hydrocarbon and a transition metal salt catalyst and can be incorporated into various types of layers. It is preferable that the composition be incorporated into layers of multilayered articles used for packaging oxygen-sensitive products such as food products.

10 Claims, No Drawings

OXYGEN SCAVENGING COMPOSITION FOR LOW TEMPERATURE USE

This is a continuation of application Ser. No. 08/196,744, filed Feb. 15, 1994 now abandoned, which is a continuation of application Ser. No. 07/955,546, filed Oct. 1, 1992 now U.S. Pat. No. 5,310,497.

FIELD OF THE INVENTION

The invention generally relates to compositions, articles and methods for scavenging oxygen in environments containing oxygen-sensitive products, particularly food and beverage products. These materials have high oxygen absorption rates at low temperatures.

BACKGROUND OF THE INVENTION

It is well known that regulating the exposure of oxygen-sensitive products to oxygen maintains and enhances the quality and "shelf-life" of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and having to restock inventory. In the food packaging industry, several means for regulating oxygen exposure have already been developed. These means include modified atmosphere packaging (MAP) and oxygen barrier film packaging.

One method currently being used is through "active packaging," whereby the package for the food product is modified in some manner to regulate the food product's exposure to oxygen. See Labuza and Breene, "Application of 'Active Packaging' for Improvement of Shelf Life and Nutritional Quality of Fresh and Extended Shelf-Life Foods," *Journal of Food Processing and Preservation*, Vol. 13, pp. 1–69 (1989). The inclusion of oxygen scavengers within the cavity of the package is one form of active packaging. Typically, such oxygen scavengers are in the form of sachets which contain a composition which scavenges the oxygen through oxidation reactions. One sachet contains iron-based compositions which oxidize to their ferric states. Another type of sachet contains unsaturated fatty acid salts on a particulate adsorbent. See U.S. Pat. No. 4,908,151. Yet another sachet contains metal/polyamide complex. See PCT Application 90/00578.

However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate.

Another means for regulating the exposure to oxygen involves incorporating an oxygen scavenger into the packaging structure itself. Through the incorporation of the scavenging material in the package itself rather than by addition of a separate scavenger structure (e.g., a sachet) to the package, a more uniform scavenging effect throughout the package is achieved. This may be especially important where there is restricted air flow inside the package. In addition, such incorporation can provide a means of intercepting and scavenging oxygen as it is passing through the walls of the package (herein referred to as an "active oxygen barrier"), thereby maintaining the lowest possible oxygen level throughout the package.

One attempt to prepare an oxygen-scavenging wall involves the incorporation of inorganic powders and/or salts. See European Applications 367,835; 366,254; 367,390; and 370,802. However, incorporation of these powders and/or salts causes degradation of the wall's transparency and mechanical properties such as tear strength. In addition, these compounds can lead to processing difficulties, especially in the fabrication of thin layers such as thin films. Even further, the scavenging rates for walls containing these compounds appear to be unsuitable for many commercial oxygen-scavenging applications, e.g. such as those in which sachets are employed.

The oxygen scavenging systems disclosed in European Applications 301,719 and 380,319 as well as disclosed in PCT 90/00578 and 90/00504 illustrate another attempt to produce an oxygen-scavenging wall. These patent applications disclose incorporating a metal catalyst-polyamide oxygen scavenging system into the package wall. This system has a low rate of oxygen scavenging which is not generally suitable for creating an internal oxygen level of less than 0.1% (starting with air) within a period of four weeks or less at room temperature, as is typically required for headspace oxygen scavenging applications. See Mitsubishi Gas Chemical Company, Inc.'s literature titled "AGELESS®-A New Age in Food Preservation" (date unknown).

Further, in regards to the incorporation of the polyamide/catalyst system into the package wall, polyamides are typically incompatible with the thermoplastic polymers, e.g. ethylene-vinyl acetate copolymers and low density polyethylenes, typically used to make flexible package walls. Even further, when polyamides are used by themselves to make a flexible package wall, they may result in inappropriately stiff structures. Polyamides also incur processing difficulties and higher costs when compared with the costs of thermoplastic polymers typically used to make flexible packaging. Even further, they are sometimes difficult to heat seal. Thus, all of these are factors to consider when selecting materials for packages, especially flexible packages and when selecting systems for reducing oxygen exposure of packaged products.

Materials having commercially usable oxygen absorption rates and capacities as well as good handling properties for use in flexible packaging are disclosed in copending application U.S. Ser. No. 679,419 filed Apr. 2, 1991. Methods of inducing oxygen absorption are disclosed in copending U.S. Ser. No. 722,067 filed Jun. 27, 1991. Both applications are incorporated herein by reference as if set forth in full.

SUMMARY OF THE INVENTION

It is an object of the invention to obtain a composition which is effective as an oxygen scavenger and is suitable for incorporating into layers used in articles containing oxygen-sensitive products.

It is a further object to obtain an oxygen scavenging composition which is compatible with the materials typically used to prepare such layers.

It is also an object to obtain compositions for scavenging oxygen which can be used in a flexible layer in a multilayer article containing oxygen-sensitive products.

It is a further object of the invention to provide a novel composition suitable for use in packaging of food and beverage products.

It is an even further object to provide oxygen scavenging articles which have high oxygen absorption rates (at least 10 cc $O_2/(m^2 \cdot day)$, preferably greater than 30) at low temperatures (<10° C.). Such articles would be particularly useful for foods benefiting from both a reduced oxygen environment and refrigerated storage.

Most oxygen scavenging compositions have very low oxygen absorption rates at low temperatures (polyamides, syndiotactic-1,2-polybutadiene); however, some novel compositions do not suffer from this limitation. Such materials include atactic-1,2-polybutadiene, EPDM rubbers, polyoctenamer, and 1,4-polybutadiene.

The invention is intended for use in coextruded films, cap liners etc. Of materials that scavenge oxygen, in general, those most desired for low temperature oxygen scavenging have a low degree of crystallinity (<30%), and a low $T_g$ (<-15° C.).

The above-mentioned goals and others will be apparent from the description that follows.

DESCRIPTION OF THE INVENTION

The invention can be used in packaging articles having several forms. Suitable articles include, but are not limited to, rigid containers, flexible bags, or combinations of both. Typical rigid or semi-rigid articles include plastic, paper or cardboard cartons or bottles such as juice containers, soft drink containers, thermoformed trays or cups which have wall thicknesses in the range of 100 to 1000 micrometers. Typical flexible bags include those used to package many food items, and will likely have thicknesses of 5 to 250 micrometers. In addition the walls of such articles often comprise multiple layers of material. This invention can be used in one, some or all of those layers.

Though it may be preferable from the standpoint of packaging convenience and/or scavenging effectiveness to employ the invention as an integral part of the package wall, the invention can also be used as a non-integral packaging component, e.g. coatings, bottle cap liners, adhesive or non-adhesive sheet inserts, sealants or fibrous mat inserts.

Besides packaging articles for food and beverage, packaging for other oxygen-sensitive products can benefit from the invention. Such products would be pharmaceuticals, oxygen sensitive medical products, corrodible metals or products such as electronic devices, etc.

The ethylenically unsaturated hydrocarbon (a) may be either substituted or unsubstituted. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable substituted or unsubstituted ethylenically unsaturated hydrocarbons are those having two or more ethylenically unsaturated groups per molecule. More preferably, it is a polymeric compound having three or more ethylenically unsaturated groups and a molecular weight equal to or greater than 1,000 weight average molecular weight.

Preferred examples of unsubstituted ethylenically unsaturated hydrocarbons include, but are not limited to, diene polymers such as polyisoprene, (e.g., trans-polyisoprene), polybutadiene (especially 1,2-polybutadienes, which are defined as those polybutadienes possessing greater than or equal to 50% 1,2 microstructure), and copolymers thereof, e.g. styrene-butadiene. Such hydrocarbons also include polymeric compounds such as polypentenamer, polyoctenamer, and other polymers prepared by olefin metathesis; diene oligomers such as squalene; and polymers or copolymers derived from dicyclopentadiene, norbornadiene, 5-ethylidene-2-norbornene, or other monomers containing more than one carbon-carbon double bond (conjugated or non-conjugated). These hydrocarbons further include carotenoids such as β-carotene.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids and their partially polymerized derivatives such as oleic, ricinoleic, dehydrated ricinoleic, and linoleic acids and derivatives thereof, e.g. esters. Such hydrocarbons also include polymers or copolymers derived from (meth)allyl (meth) acrylates.

The composition used may also comprise a mixture of two or more of the substituted or unsubstituted ethylenically unsaturated hydrocarbons described above.

As will also be evident, ethylenically unsaturated hydrocarbons which are appropriate for forming solid transparent layers at room temperature are preferred for scavenging oxygen in the packaging articles described above. For most applications where transparency is necessary, a layer which allows at least 50% transmission of visible light is acceptable.

When making transparent oxygen-scavenging layers according to this invention, 1,2-polybutadiene is especially preferred as component (a). For instance, 1,2-polybutadiene can exhibit transparency, mechanical properties and processing characteristics similar to those of polyethylene. In addition, this polymer is found to retain its transparency and mechanical integrity even after most or all of its oxygen capacity has been consumed, and even when little or no diluent resin is present. Even further, 1,2-polybutadiene exhibits a relatively high oxygen capacity and, once it has begun to scavenge, it exhibits a relatively high scavenging rate as well.

Most oxygen scavenging compositions have very low oxygen absorption rates at low temperatures. This is a disadvantage when oxygen absorption is needed, for example, under refrigerated conditions. The preferred oxygen scavengers of this invention have high oxygen absorption rates (at least 10 cc $O_2/(m^2 \cdot day)$, preferably greater than 30) at temperatures (<10° C.). Of materials that scavenge oxygen, in general, those most desired for low temperature oxygen scavenging have a low degree of crystallinity (<30%) and a low glass transition temperature (Tg <-15° C.), preferably <-25°, more preferably <-40° C. Materials which meet these criteria include atactic-1,2-polybutadiene (greater than 50% atactic) EPDM rubbers (typically -58° to -50° C., polyoctenamer (Tg about -75° C.) and 1,4-polybutadiene (greater than 50% 1,4 microstructure, Tg typically -60° to -75° C.), as well as partially polymerized unsaturated fatty acids. One of ordinary skill in the art will recognize that the above-described p olymers can exist in multiphase compositions. In such a case, it is the Tg of the phase(s) containing the ethylenic unsaturation which need to meet the above-described criteria.

As indicated above, (b) is a transition metal catalyst. While not being bound by any particular theory, suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, (b) is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. suitable counterions for the metal include, but are not limited to, chloride, acetate, stearate, palmitate, 2-ethylhexanoate, neodecanoate or naphthenate. Particularly preferable salts include cobalt (II) 2-ethylhexanoate and cobalt (II) neodecanoate. The metal salt may also be an ionomer, in which case a polymeric counterion is employed. Such ionomers are well known in the art.

When making layers, such as film layers, from compositions wherein (a) is a polymeric compound such as polybutadiene, polyisoprene or copolymers thereof or polypentenamer, etc., the layer can be prepared directly from (a). On the other hand, (a) and transition metal catalyst (b) may be further combined with one or more polymeric diluents, such as thermoplastic polymers which are typically used to form film layers in plastic packaging articles. Even in the event (a) is a thermoplastic polymer, e.g. polybutadiene, it is sometimes suitable to include one or more additional polymeric diluents. In the manufacture of certain packaging articles well known thermosets can also be used as the polymeric diluent.

Selecting combinations of diluent and (a) depends on the properties desired. Polymers which can be used as the diluent include, but are not limited to, polyethylene terephthalate (PET), polyethylene, low or very low density polyethylene, ultra-low density polyethylene, linear low density polyethylene, polypropylene, polyvinyl chloride, polystyrene, and ethylene copolymers such as ethylene-vinyl acetate, ethylene-alkyl (meth)acrylates, ethylene-(meth)acrylic acid and ethylene-(meth)acrylic acid ionomers. In rigid articles such as beverage containers PET is often used. See European Application 301,719. Blends of different diluents may also be used. However, as indicated above, the selection of the polymeric diluent largely depends on the article to be manufactured and the end use. Such selection factors are well known in the art.

If a diluent polymer such as a thermoplastic is employed, it should further be selected according to its compatibility with the ethylenically unsaturated hydrocarbon selected for (a). In some instances, the clarity, cleanliness, effectiveness as an oxygen scavenger, barrier properties, mechanical properties and/or texture of the article can be adversely affected by a blend containing a polymer which is incompatible with (a). For instance, it has been found that when (a) is dehydrated castor oil, a less "greasy" film is prepared from a blend with ethylene-acrylic acid copolymer than with ethylene vinyl acetate copolymer.

Further additives may also be included in the composition to impart properties desired for the particular article being manufactured. Such additives include, but are not necessarily limited to, fillers, pigments, dyestuffs, antioxidants, stabilizers, processing aids, plasticizers, fire retardants, anti-fog agents, etc.

The mixing of the components listed above is preferably accomplished by melt-blending at a temperature in the range of 50° C. to 300° C. However alternatives such as the use of a solvent followed by evaporation may also be employed. The blending may immediately precede the formation of the finished article or preform or precede the formation of a feedstock or masterbatch for later use in the production of finished packaging articles. When making film layers or articles from oxygen-scavenging compositions, (co) extrusion, solvent casting, injection molding, stretch blow molding, orientation, thermoforming, extrusion coating, coating and curing, lamination or combinations thereof would typically follow the blending.

The amounts of (a), (b), optional polymeric diluents and additives, vary depending on the article to be manufactured and its end use. These amounts also depend on the desired oxygen scavenging capacity, the desired oxygen scavenging rate, and the particular materials selected.

For instance, the primary function of (a) is to react irreversibly with oxygen during the scavenging process, and the primary function of (b) is to facilitate this process. Thus, to a large extent, the amount of (a) will affect the oxygen capacity of the composition, i.e., affect the amount of oxygen that the composition can consume, and the amount of (b) will affect the rate at which oxygen is consumed. It also thus follows that the amount of (a) is selected in accordance with the scavenging capacity needed for a particular application, and the amount of (b) is selected in accordance with the scavenging rate needed. Typically, the amount of (a) may range from 1 to 99%, preferably from 10 to 99%, by weight of the composition or layer in which both (a) and (b) are present (herein referred to as the "scavenging component", e.g., in a coextruded film, the scavenging component would comprise the particular layer(s) in which (a) and (b) are present together). Typically, the amount of (b) may range from 0.001 to 1% (10 to 10,000 ppm) of the scavenging component, based on the metal content only (excluding ligands, counterions, etc.). In the event the amount of (b) is about 0.5% or less, it follows that (a) and/or the diluent will comprise substantially all of the composition.

If one or more diluent polymers are used, those polymers may comprise, in total, as much as 99% by weight of the scavenging component.

Any further additives employed would normally not comprise more than 10% of the scavenging component, with preferable amounts being less than 5% by weight of the scavenging component.

As mentioned above, the oxygen scavenging composition may be used in a flexible or rigid single layer or multilayer article. The layers comprising the composition may be in several forms. They may be in the form of stock films, including "oriented" or "heat shrinkable" films, which may ultimately be processed as bags, etc. The layers may also be in the form of sheet inserts to be placed in a packaging cavity. In rigid articles such as beverage containers, thermoformed trays or cups, the layer may be within the container's walls. Even further, the layer may also be in the form of a liner placed with or in the container's lid or cap. The layer may even be coated or laminated onto any one of the articles mentioned above.

In multilayered articles, the oxygen scavenging layer may be included with layers such as, but not necessarily limited to, "oxygen barriers", i.e. layers of material having an oxygen transmission rate equal to or less than 500 cubic centimeters per square meter ($cc/m^2$) per day per atmosphere at room temperature, i.e. about 25° C. Typical oxygen barriers comprise poly(ethylene vinyl alcohol), polyacrylonitrile, polyvinyl chloride, poly(vinylidene dichloride), polyethylene terephthalate, silica, and polyamides. Copolymers of certain materials described above, and metal foil layers, can also be employed.

The additional layers may also include one or more layers which are permeable to oxygen. In one preferred embodiment, especially for flexible packaging for food, the layers include, in order starting from the outside of the package to the innermost layer of the package, (i) an oxygen barrier layer, (ii) a layer comprising the invention, i.e. the scavenging component as defined earlier, and optionally, (iii) an oxygen permeable layer. Control of the oxygen barrier property of (i) allows a means to regulate the scavenging life of the package by limiting the rate of oxygen entry to the scavenging component (ii), and thus limiting the rate of consumption of scavenging capacity. Control of the oxygen permeability of layer (iii) allows a means to set an upper limit on the rate of oxygen scavenging for the overall structure independent of the composition of the scavenging component (ii). This can serve the purpose of extending the handling lifetime of the films in the presence of air prior to sealing of the package. Furthermore, layer (iii) can provide a barrier to migration of (a), (b), other additives, or by-products of scavenging into the package interior. Even further, layer (iii) may also improve the heat-sealability, clarity and/or resistance to blocking of the multilayer film.

The multilayered articles can be prepared using coextrusion, coating and/or lamination. In addition to oxygen barrier and oxygen permeable layers, further layers such as adhesive layers may be adjacent to any of the layers listed above. Compositions suitable for adhesive layers include those well known in the art, such as anhydride functional polyolefins.

To determine the oxygen scavenging capabilities of the invention, the rate of oxygen scavenging can be calculated by measuring the time elapsed before the article depletes a certain amount of oxygen from a sealed container. For instance, a film comprising the scavenging component can be placed in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining.

When an active oxygen barrier is required, a useful scavenging rate can be as low as 0.05 cc oxygen ($O_2$) per gram of (a) in the scavenging component per day in air at 25° C. and at 1 atmosphere pressure. However, the composition of this invention has the capability of rates equal to or greater than 0.5 cc oxygen per gram of (a) per day, thus making it suitable for scavenging oxygen from within a package, as well as suitable for active oxygen barrier applications. The composition is even capable of more preferable rates equal to or greater than 5.0 cc $O_2$ per gram of (a) per day.

Generally, film layers suitable for use as an active oxygen barrier can have a scavenging rate as low as 1 cc oxygen per square meter per day when measured in air at 25° C. and 1 atmosphere pressure. However, a layer of this invention is capable of a scavenging rate greater than 10 cc oxygen per square meter per day, and preferably has an oxygen scavenging rate equal to or greater than about 25 cc oxygen per square meter per day under the same conditions, thus making it suitable for scavenging oxygen from within a package, as well as suitable for active oxygen barrier applications. Under different temperature and atmospheric conditions, the scavenging rates of the composition and layers of the invention will be different. The rates at room temperature and one atmosphere were measured because they best represent the conditions under which the invention will be exposed in many instances.

In an active oxygen barrier application, it is preferable that the combination of oxygen barriers and any oxygen scavenging activity create an overall oxygen transmission rate of less than about 1.0, more preferably less than 0.5, and even more preferably less than 0.1 cubic centimeters per square meter per day per atmosphere at 25° C. It is also preferable that the oxygen scavenging capacity is such that this transmission rate is not exceeded for at least two days. See European Application 301,719. Another definition of acceptable oxygen scavenging is derived from testing actual packages. In actual use, the scavenging rate requirement will largely depend on the internal atmosphere of the package, the contents of the package and the temperature at which it is stored. In actual use, it has been found that the scavenging rate of the oxygen scavenging article or package should be sufficient to establish an internal oxygen level of less than 0.1% in less than about four weeks. See Mitsubishi literature supra.

In a packaging article according to this invention, the scavenging rate capability will depend primarily on the amount and nature of (a) and (b), and secondarily on the amount and nature of other additives (e.g., diluent polymer, antioxidant, etc.) which are present in the scavenging component, as well as the overall manner in which the package is fabricated, e.g., surface area/volume ratio.

The oxygen scavenging capacity of an article comprising the invention can be measured by determining the amount of oxygen consumed until the article becomes ineffective as a scavenger. The scavenging capacity of the package will depend primarily on the amount and nature of (a) present in the scavenging component.

In actual use, the oxygen scavenging capacity requirement of the article will largely depend on three parameters of each application:

(1) the quantity of oxygen initially present in the package, (2) the rate of oxygen entry into the package in the absence of the scavenging property, and (3) the intended shelf life for the package.

The scavenging capacity of the composition can be as low as 1 cc oxygen per gram, but is preferably at least 10 cc oxygen per gram, and more preferably at least 50 cc oxygen per gram. When such compositions are in a layer, the layer will preferably have an oxygen capacity of at least 250 cc oxygen per square meter per mil thickness and more preferably at least 1200 cc and more preferably 2400 cc oxygen per square meter per mil thickness.

Other factors may also affect oxygen scavenging and should be considered when selecting compositions for the scavenging. These factors include but are not limited to temperature, relative humidity, and the atmospheric environment in the package.

EXAMPLE 1

MASTERBATCH PREPARATION

A masterbatch comprising transition metal catalyst was prepared by a continuous compounding and pelletizing operation. In particular, a dry blend of poly(ethylene vinylacetate), having a 9% vinylacetate content (EVA-9), and pellets of TEN-CEM® cobalt neodecanoate catalyst (22.5% cobalt by weight) from Mooney Chemicals, was placed in the hopper of a BRABENDER® counter-rotating, intermeshing, twin screw extruder, equipped with a strand die. The amount of catalyst used was 2.3% by weight, to give 5000 ppm cobalt in the masterbatch. The extruder was maintained at 120° C., with the die at 110° C. The resulting strand was fed through a water bath to cool and then dried with an air knife. The strand was then fed into a KILLION® pelletizer. The resulting pellets, herein referred to as the "cobalt masterbatch", were then used in the formulations illustrated below.

A second masterbatch containing 10% benzophenone photoinitiator (Aldrich) and 5000 ppm TEN-CEM® cobalt was prepared by the same method. The second masterbatch is herein referred to as "cobalt, benzophenone masterbatch". Comparison A multilayer, blown film was prepared by coextrusion using the cobalt, benzophenone masterbatch prepared above. The resulting film was a two layer structure having a thickness of about 3 mils. One layer comprised poly (ethylene vinylacetate) about 1–1.5 mils thick, and the other (scavenging) layer comprised 90% syndiotactic-1,2-polybutadiene (RB830, Japan Synthetic Rubber, Tg −15° C., crystallinity 29%) and 10% cobalt benzophenone masterbatch. Samples of various sizes (indicated as 891 cm² or 963 cm² in this example), were UV irradiated for 5 minutes on an Amergraph™ blacklight unit (about 3.2 mW/cm²) and then sealed in barrier bags containing 390 cc of air. Samples were then either stored at room temperature or were refrigerated (3°–4° C.). Gas samples (4 cc) were withdrawn from the bags through an adhesive rubber strip, and were analyzed on a Mocon™ model LC-700F oxygen analyzer. The following data indicate the drastic effect that refrigerated storage can have on oxygen scavenging rate.

| Time (Days) | Room Temp. 891 cm² Percent O$_2$ | Refrigerated 963 cm² Percent O$_2$ |
|---|---|---|
| 0 | 20.6 | 20.6 |
| 1 | 0.364 | — |
| 2 | 0.000 | — |
| 3 | — | 18.8 |
| 14 | 0.000 | 13.3 |
| 21 | — | 6.9 |
| 31 | — | 0.84 |
| 35 | 0.000 | 0.000 |

These data give a room temperature scavenging rate of 450 cc O$_2$/m²/day, and a refrigerated rate of 24 cc O$_2$/m²/day. The ratio of the room temperature rate to the refrigerated is therefore about 19 to 1.

EXAMPLE 2

A formulation was prepared in a Brabender mixing chamber which consisted of EPDM rubber (Vistaion 3708, Exxon) and 10% by weight cobalt benzophenone masterbatch. Films were pressed and tested as described above. These data indicate that the scavenging rate of some materials is less affected by temperature.

| Time (days) | Room Temp. 110 cm² Percent O$_2$ | Refrigerated 108 cm² Percent O$_2$ |
|---|---|---|
| 0 | 20.6 | 20.6 |
| 1 | — | 20.2 |
| 3 | — | 18.8 |
| 4 | 10.1 | — |
| 10 | 1.3 | 11.8 |
| 13 | — | 10.3 |
| 14 | 0.000 | — |
| 30 | — | 4.6 |
| 78 | — | 0.008 |

These data give a room temperature scavenging rate of about 174 cc O$_2$/m²/day, and a refrigerated rate of about 32 cc O$_2$/m²/day. This gives a room temperature to refrigerated rate ratio of 5.4 to 1.

EXAMPLE 3

A formulation was prepared in a Brabender mixing chamber which consisted of EPDM rubber (Vistalon 3708, Exxon) with 20% by weight polyoctenamer (Vestenamer 6213, Hüls), and 10% by weight cobalt benzophenone masterbatch. Vestenamer 6213 is <10% crystalline at room temperature, and has a T$_g$=−75 ° C. Films were pressed and tested as described above. These data indicate a synergistic effect in the scavenging rate of this blend, as well as less of a temperature effect.

| Time (days) | Room Temp. 102 cm² Percent O$_2$ | Refrigerated 87 cm² Percent O$_2$ |
|---|---|---|
| 0 | 20.6 | 20.6 |
| 1 | 7.9 | 17.9 |
| 2 | 4.08 | 14.2 |
| 5 | 0.31 | 9.1 |
| 8 | 0.000 | 6.4 |
| 12 | — | 4.55 |
| 26 | — | 2.78 |

A masterbatch was prepared as in Example 1, except that the amount of cobalt was 1.5% by weight and the amount of benzophenone was 5% by weight.

These data give a room temperature scavenging rate of about 330 cc O$_2$/m²/day, and a refrigerated rate of about 100 cc O²/m²/day. This gives a room temperature to refrigerated rate ratio of 3.3 to 1.

EXAMPLE 4

A masterbatch was prepared as in Example 1, except that the amount of cobalt was 1.5% by weight and the amount of benzophenone was 5% by weight. Two multilayer shrink barrier structures were prepared by a double pass extrusion coating process. The inner (heat seal) polyolefin layers were e-beam irradiated prior the first coating pass, which deposited the oxygen scavenging layer. A second pass deposited the poly(vinylidene dichloride) barrier layers and the outer polyolefin abuse layers. The tubing was then biaxially oriented about 13 to 1, giving 1.4–1.5 mil of polyolefin between the interior of the tube, and the scavenging layer, about 0.55 mil of scavenging layer, and about 0.2 mil barrier layer in the final structure. In the first structure (I), the scavenging layer consisted of 60% EPDM (Vistaion 3708, Exxon), polyoctenamer (Vestenamer 6213, Hüls), and 10% cobalt/benzophenone masterbatch. The second structure (II) had a scavenging layer consisting of 90% syndiotactic-1,2-poly(butadiene) (RB830, JSR), and 10% cobalt/benzophenone masterbatch. The final structures were fashioned into bags, which were UV irradiated 5 minutes on each side as described above. In room temperature tests, bags were inflated with 600 cc of air. In refrigerated tests, 150 cc of air was used. Samples were removed and tested for oxygen concentration as described above.

| Time days | I Room Temp. 651 cm² % O₂ | I Refrig. 391 cm² % O₂ | II Room Temp. 647 cm² % O₂ | II Refrig. 417 cm² % O₂ |
|---|---|---|---|---|
| 0 | 20.6 | 20.6 | 20.6 | 20.6 |
| 1 | 16.4 | 18.2 | 20.3 | — |
| 3 | 7.90 | — | 19.8 | 20.6 |
| 5 | — | 4.50 | — | — |
| 8 | — | — | — | 20.3 |
| 9 | — | 0.24 | — | — |
| 14 | 0.00 | — | 11.0 | 20.3 |
| 15 | — | 0.07 | — | — |
| 21 | 0.00 | — | 7.30 | 20.3 |
| 29 | — | — | 4.20 | 20.3 |

These data give a room temperature scavenging rate for structure I of about 136 cc $O_2/m^2$·day and a refrigerated rate of about 53 cc $O_2/m^2$·day giving a room temperature to refrigerated rate ratio of 2.6 to 1. For structure II, these data give a room temperature scavenging rate of about 98.4 cc $O_2/m^2$·day and a refrigerated rate of only 0.4 cc $O_2/m^2$·day giving a room temperature to refrigerated rate ratio of 246 to 1. These data further indicate that in oriented, multilayer structures, the drop in scavenging rate with temperature for the RB830 based scavenging systems is even greater.

EXAMPLE 5

A masterbatch was prepared as in Example 4. A formulation was prepared in a Brabender® mixing chamber consisting of 70% syndiotactic-1,2-poly(butadiene) (RB830, JSR), 20% atactic-1,2-poly(butadiene) (Edison Polymer Innovation Corp., MW=40,000), and 10% cobalt/benzophenone masterbatch. Films were pressed with a surface area of 200 cm², irradiated for 5 minutes as described above, and sealed in barrier bags with 600 cc of air for room temperature samples, and 150 cc air for refrigerated samples. Oxygen was monitored as described above. These data indicate that atactic-1,2-poly(butadiene) is useful to improve the refrigerated scavenging rate.

| Time days | Room Temp. % O₂ | Refrig. % O₂ |
|---|---|---|
| 0 | 20.6 | 20.6 |
| 1 | 17.2 | 20.0 |
| 6 | 10.1 | 16.8 |
| 19 | 4.90 | 8.90 |
| 26 | 3.70 | 4.90 |
| 35 | 2.94 | 2.26 |
| 43 | 2.31 | 1.08 |

These data indicate a room temperature scavenging rate of about 128 cc $O_2/(m^2$·d), and a refrigerated scavenging rate of about 34 cc $O_2/(m^2$·d), giving a room temperature to refrigerated rate ratio of 3.8 to 1.

What is claimed:

1. An oxygen scavenging composition in the form of a film, said composition comprising
   (1) an oxygen scavenging system consisting essentially of
      (a) an ethylenically unsaturated hydrocarbon polymer having a weight average molecular weight of at least about 1,000, and a glass transition temperature (Tg) of lower than −15° C., and
      (b) from 10 to 10,000 ppm of transition metal in the form of a transition metal salt; and
   (2) a photoinitiator or mixtures of photoinitiators;

said composition has an oxygen absorption rate of at least 10 cc O₂ per m² per day at a temperature of 4° C. and an oxygen absorption capacity of at least 250 cc oxygen per m² per mil thickness.

2. The composition according to claim 1 wherein the ethylenically unsaturated hydrocarbon polymer (a) has a glass transition temperature of lower than −25° C.

3. The composition according to claim 1 wherein polymer (a) is selected from the group consisting of atactic 1,2-polybutadiene, EPDM rubbers, polyoctenamer, 1,4-polybutadiene, or block or graft copolymers thereof, partially polymerized unsaturated fatty acids and their esters, and mixtures thereof.

4. The composition according to claim 3 wherein the ethylenically unsaturated hydrocarbon polymer (a) has a glass transition temperature of lower than −25° C.

5. The composition according to claim 3 wherein the photoinitiator is selected from the group consisting of benzophenone, o-methoxybenzophenone, acetophenone, o-methyoxy-acetophenone, acenaphthenequinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz(de)anthracen-7-one, bezoin tetrahydropyranyl ether, 4,4'-bis(dimethylamine)benzophenone, 1'-acetonaphthone, 2'-acetonaphthone, acetonaphthone and 2,3-butanedione, benz(a)anthracene-7,12-dione, 2,2-dimethyoxy-2-2phenylacetophenone, α,α-diethoxyacetophenone, α,α-dibutoxyacetophenone, methylene blue, tetraphenyl porphine, and mixtures thereof.

6. The composition according to claim 5 wherein the photoinitiator is selected from the group consisting of benzophenone, substituted benzophenone, acetophenone, substituted acetophenone, acetonaphthone, substituted acetonaphthone and mixtures thereof.

7. The composition according to claim 1 wherein the photoinitiator is selected from the group consisting of benzophenone, o-methoxybenzophenone, acetophenone, o-methyoxy-acetophenone, acenaphthenequinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz(de)anthracen-7-one, bezoin tetrahydropyranyl ether, 4,4'-bis(dimethylamine)benzophenone, 1'-acetonaphthone, 2'-acetonaphthone, acetonaphthone and 2,3-butanedione, benz(a)anthracene-7,12-dione, 2,2-dimethyoxy-2-2phenylacetophenone, α,α-diethoxyacetophenone, α,α-dibutoxyacetophenone, methylene blue, tetraphenyl porphine, and mixtures thereof.

8. The composition according to claim 7 wherein the photoinitiator is selected from the group consisting of benzophenone, substituted benzophenone, acetophenone, substituted acetophenone, acetonaphthone, substituted acetonaphthone and mixtures thereof.

9. The composition according to claim 7 wherein the ethylenically unsaturated hydrocarbon polymer (a) has a glass transition temperature of lower than −25° C.

10. A product in the form of a multilayer flexible film having at least one layer of said film comprising the composition of claim 1, 3, 7, 5, 8, 6, 2, 4, or 9 and said flexible film has an oxygen transmission of <1 cc $O_2/(m^2 \cdot day \cdot atm)$ at 25° C.

* * * * *